United States Patent [19]

Shaw

[11] Patent Number: 4,957,361
[45] Date of Patent: Sep. 18, 1990

[54] METHOD OF PRODUCING AND DISPLAYING A 3-D MOTION PICTURE

[75] Inventor: William C. Shaw, Streetsville, Canada

[73] Assignee: Imax Systems Corporation, Toronto, Canada

[21] Appl. No.: 209,732

[22] Filed: Jun. 22, 1988

Related U.S. Application Data

[63] Continuation of Ser. No. 32,273, Mar. 31, 1987, abandoned.

[51] Int. Cl.⁵ ............................................. G03B 35/00
[52] U.S. Cl. ........................................ 352/59; 352/69; 352/239
[58] Field of Search ....................... 352/59, 239, 69, 60

[56] References Cited

U.S. PATENT DOCUMENTS 1,860,737  5/1932  Handschiegl .......................... 352/45
2,630,737  3/1953  Ramsdell ................................ 352/60
4,650,305  3/1987  Hines ..................................... 352/59

FOREIGN PATENT DOCUMENTS 740927  11/1955  United Kingdom .................... 352/59

OTHER PUBLICATIONS

"Large Screen 3-D ... ", *Perforations*, vol. 3, No. 4, Jul. 1983.
Letter from Polaroid Corporation, dated 8-9-56 signed by Donald L. Brown.
"3-D Imax Camera Assembly", *Perforations*, vol. 4, No. 4, 1984.
"3-D Imax Progress Report", *Perforations*, vol. 4, No. 4, 1984.
"Future Cinema", *Perforations*, vol. 4, No. 3, 1984.

Primary Examiner—Monroe H. Hayes
Attorney, Agent, or Firm—Rogers, Bereskin & Parr

[57] ABSTRACT

A method of producing and displaying a 3-D motion picture is disclosed. Two master film negatives are prepared using a camera rig employing one camera that looks directly at the subject through a semi-transparent mirror and a second camera that looks at the same subject by way of the reflective surface of the mirror, to obtain left and right eye images. The cameras are oriented so that the mirror images recorded by the second camera are turned laterally of the film in being reflected by the mirror. Contact prints are made from the negatives. Before projecting the images, the contact print from the negative that was shot by way of the mirror is turned about its longitudinal axis so that images on that print are turned laterally. Images from the two prints are simultaneously projected onto the same screen to produce a coincident 3-D image. The left and right eye images are optically coded, for example by using optical filters that are polarized at right angles to one another. The viewer wears spectacles having corresponding polarized lenses so that the left eye sees only projected left eye images while the right eye sees only projected right eye images.

4 Claims, 4 Drawing Sheets

SIDE ELEVATION

SIDE ELEVATION

PLAN

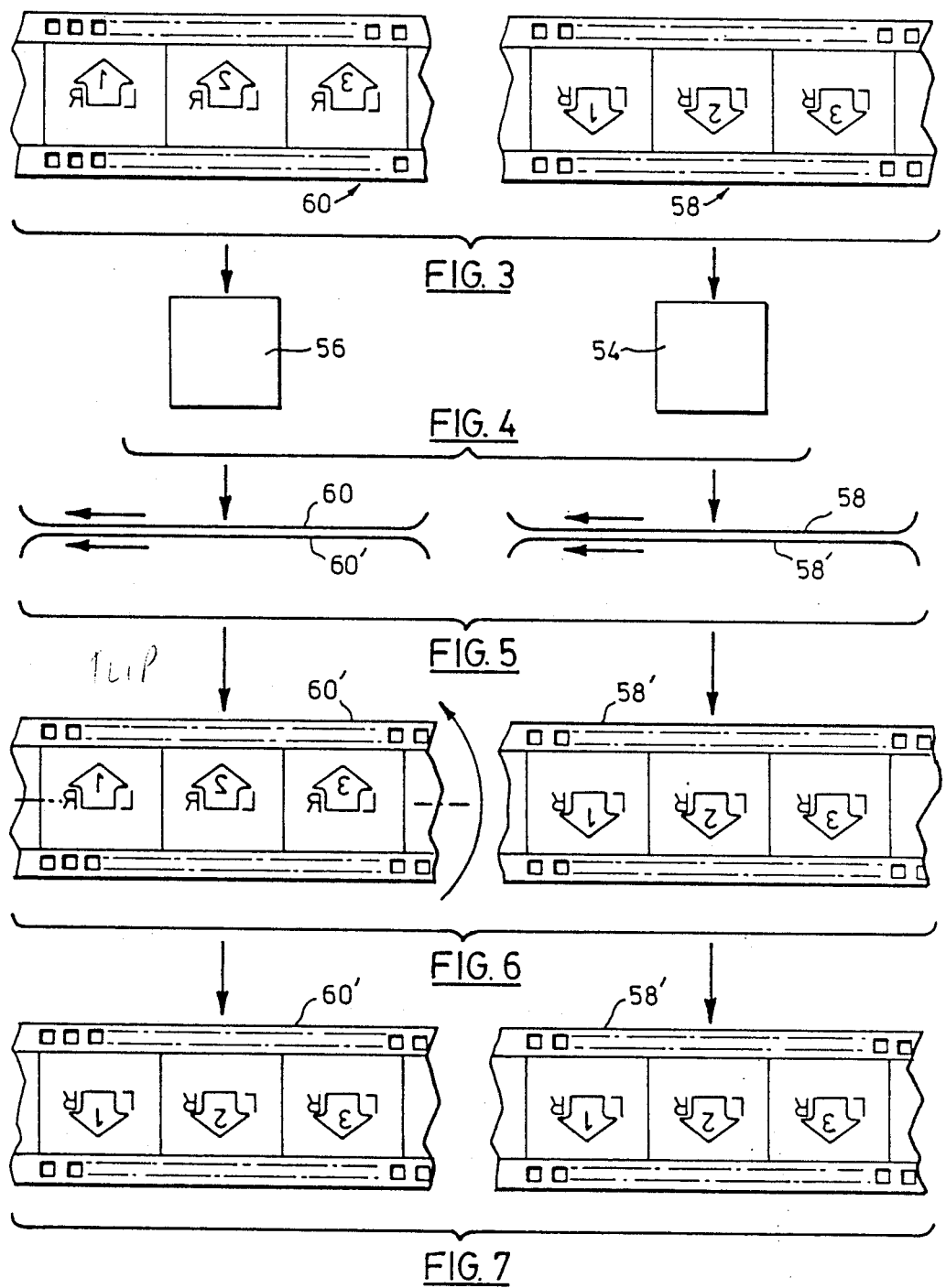

PLAN

METHOD OF PRODUCING AND DISPLAYING A 3-D MOTION PICTURE

This is a continuation of application Ser. No. 032,273, filed Mar. 31, 1987, now abandoned.

FIELD OF THE INVENTION

This invention relates generally to stereoscopic or three-dimensional motion pictures (hereinafter called 3-D motion pictures) and is concerned more particularly with method of producing and displaying a 3-D motion picture.

BACKGROUND OF THE INVENTION

Many attempts have been made to produce 3-D motion pictures. The technique generally used involves simultaneously photographing a subject using two motion picture cameras positioned to provide left and right eye views of the subject. The images recorded on films in those cameras are then simultaneously projected onto a screen and are optically coded in some way so that the left eye of a viewer sees only the images that were recorded by the "left eye" camera while the viewer's right eye sees only the "right eye" images. The viewer then perceives a stereoscopic or 3-D effect.

One method of coding the images involves using colour filters (anaglypta). For example, the right eye images may be coloured blue and the left eye images red and the viewer provided with spectacles having filters that are coloured so that the viewer's right eye sees only blue images and the left eye sees only red images. A disadvantage of this technique is of course it can be used only with two colour images. A related technique that can be used with full colour motion pictures involves the use of polarized light. By providing the respective left and right eye projectors with filters that are polarized in directions at 90° to one another and providing the viewer having spectacles with correspondingly polarized lenses, full colour 3-D images can be viewed.

Spectacular 3-D motion pictures can be made by using these known techniques with large format films such as those that are available from Imax Systems Corporation of Toronto, Canada under the registered trade marks IMAX and OMNIMAX. The use of large format films has become possible as a result of development of the so-called "rolling loop" film transport mechanism for cameras and projectors. U.S. Pat. No. 3,494,524 to Jones discloses the principle of a rolling loop transport mechanism. A number of improvements in the original Jones mechanism are disclosed in U.S. Pat. Nos. 3,600,073, 4,365,877 and 4,441,796 (all to Shaw). All of these patents have been assigned to Imax Systems Corporation.

A practical difficulty of making 3-D motion picture films is that presently available cameras cannot be positioned sufficiently close to one another that the axes of the camera lenses are at the required interocular distance of two to three inches (i.e. a typical eye spacing) that is necessary to obtain a proper 3-D effect.

Accordingly, an object of the present invention is to provide an improved method of producing and displaying 3-D motion pictures that may be used with large format film.

SUMMARY OF THE INVENTION

The method of the invention involves the use of a camera rig that includes first and second motion picture cameras each having a lens defining an optical axis, and a semi-transparent mirror. The cameras and mirror are positioned in a relationship with one another such that, with the rig in a datum position, the first camera is arranged with its optical axis horizontal for recording images of a subject through the mirror along a first axis co-incident with its said optical axis, the second camera is arranged with its optical axis at a 90° angle to the optical axis of the first camera, and the mirror is positioned at the intersection of said optical axes in a plane that bisects said 90° angle and permits the second camera to record images of the same subject along a second axis that is reflected by the mirror to be co-incident with the optical axis of the second camera. The first and second axes are generally parallel to one another and spaced by a defined distance and in a horizontal plane so that one of the cameras receives "left eye" images of the subject and the camera receives "right eye" images. The cameras are oriented such that an erect subject is recorded as a series of parallel inverted images on a film that is advanced in said first camera and as a series of similar mirror images that are turned laterally of the film as a result of being reflected in said mirror on a film that is advanced in said second camera.

Using this camera rig, two master film negatives are made by exposing respective films in the cameras to subjects intended to appear in the motion picture and developing the films. Respective contact prints are then made from the master film negatives. The print from the master film negative that originated from the second camera is then turned face for face about a longitudinal axis of the print so that images on the print are turned laterally of the print as compared with the images as recorded during photography, to bring the images on the respective prints into corresponding orientations for projection. Respective left and right eye images are simultaneously projected from the two film prints to provide coincident 3-D images on a screen. The left and right eye images are optically coded and the viewer is provided with decoding means for ensuring that left eye images are presented to the viewer's left eye only and that right eye images are presented to the viewer's right eye only.

Coding of the images may be effected by any of the various known techniques such as those discussed above. Polarization techniques are of course preferred because they permit the use of full colour films. Another known technique that may be used involves the use of what are in effect shutters on spectacles worn by a viewer that open and close in timed relation to timed projection of images onto the screen so that, in effect, the viewer's right eye is closed when left eye images appear and vice versa.

BRIEF DESCRIPTION OF THE DRAWINGS

In order that the invention may be more clearly understood, reference will now be made to the accompanying diagrammatic drawings which illustrate a preferred embodiment of the invention by way of example, and in which:

FIG. 3 illustrates two series of images as they would appear on films in the left- and right-hand cameras respectively of the rig shown in the previous views;

FIGS. 4 and 5 are schematic illustrations of conventional developing and contact printing steps respectively;

FIG. 6 is a view similar to FIG. 3 showing the contact prints obtained from the step of FIG. 5;

FIG. 7 shows the contact prints as oriented for to projection;

DESCRIPTION OF THE PREFERRED EMBODIMENT

Figure 1:
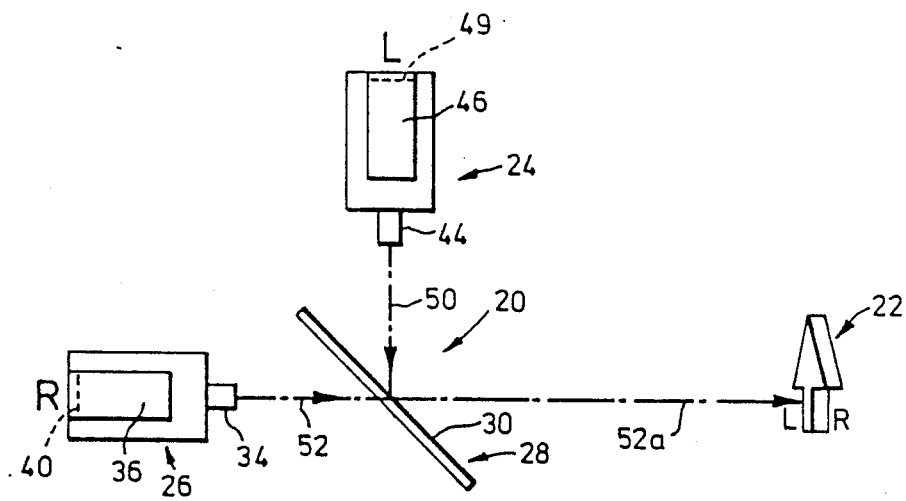
FIG. 1 is a side elevational view of a camera rig for use in the method of the invention.
Figure 2:
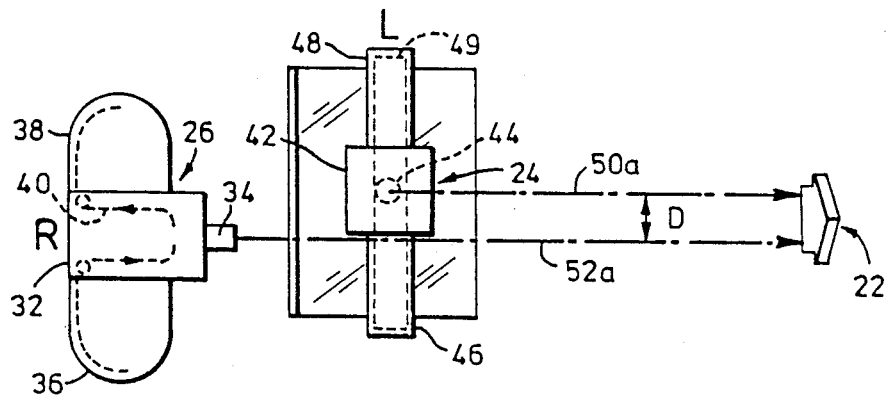
FIG. 2 is a plan view corresponding to FIG. 1.

Referring first to FIGS. 1 and 2, a camera rig for use in the method of the invention is generally indicated by reference numeral 20 and is shown positioned for photographing a subject represented by an erect three dimensional arrow. For simplicity, only the essential components of the rig 20 have been shown. These are respective left and right cameras 24 and 26 and a semi-transparent mirror 28 having a reflective surface 30.

The cameras 24 and 26 are identical and are of well-known construction. Accordingly, they have not been shown in detail. Referring specifically to FIG. 2 and camera 26 by way of example, the camera has a body 32 fitted with a lens 34 and carrying external film magazines 36 and 38. A portion of a length of film is indicated in dotted outline at 40 and is shown for travel from magazine 36, through the camera body 32 to magazine 38. It will be noted that the film travels horizontally through the camera body so that an erect subject such as subject 22 is recorded as an image extending transversely of the film as shown in FIG. 3.

Within body 32, camera 26 has a conventional film advance mechanism and shutter assembly. A suitable camera for use in the method is manufactured by Imax Systems Corporation. However, in principle, the method of the invention may be used with any motion picture camera.

Camera 24 is essentially identical with camera 26 and has a body 42, lens 44 and film magazines 46 and 48, and film 49.

The two cameras 24 and 26 are positioned with respect to the mirror 28 such that the optical axes 50 and 52 of the respective cameras are oriented at a 90° angle to one another with the mirror disposed at the intersection of the axes and bisecting the 90° angle. Specifically, camera 26 is positioned with its optical axis 52 horizontal and directed towards subject 22 while camera 24 is positioned above camera 26 with its lens 44 directed downwardly and its optical axis 50 90° from camera 26 axis (more or less vertical). Mirror 28 permits camera 26 to directly record an image of subject 22 along a first axis 52a (FIG. 2) coincident with axis 52 while camera 24 records an image of the subject along a second axis 50a that is reflected by the mirror (FIG. 1) to be coincident with axis 50.

As best seen in FIG. 2, the cameras are laterally spaced from one another so that, between the subject 22 and the mirror 28, the two axes 50a and 52a are parallel or slightly converged and spaced from one another by defined distance represented by the letter "D" in FIG. 2. This distance is usually set to correspond with the distance between the eyes of a typical viewer (the interocular distance) and is generally in the order of two to three inches. Thus, it will be seen that camera 24 in effect obtains a left eye view of the object 22 while camera 26 obtains a corresponding right eye view, the two viewpoints being spaced by the required interocular distance. The letters "L" and "R" are used in FIGS. 1 and 2 to denote left and right cameras.

Orientation of the cameras in this fashion causes an erect subject (such as subject 22) to be recorded as a series of parallel, inverted images in camera 26 (the first camera) and, in camera 24 (the second camera), as a series of mirror images that are similar to the images recorded by camera 26 but turned laterally of the film (re-inverted). FIG. 3 shows portions of the films from the two cameras, denoted 58 in the case of the film from the right eye camera 26 and 60 in the case of the film from the left eye camera 24. The films are shown as seen from the side of the film furthest from the subject. The images on the film are drawn to represent the images of the subject 22 (the erect arrow) as they would appear on the respective films. As noted above, the images on film 58 are inverted and turned from left to right as compared with the subject 22 due to the normal effect of the lens 34 in camera 26. The images on negative 60 are mirror images and have additionally been turned laterally of the film (top to bottom as drawn) and left to right as compared with the negative 58.

It will of course be understood that, having established the relative positions of the cameras and mirror as shown in FIG. 1 for photographing an erect subject that is to appear erect in the final motion picture, the rig may be manipulated and oriented to produce the results required in the motion picture. In other words, the orientation of the rig as shown in FIGS. 1 and 2 is merely a datum position which may change in shooting a film, provided the relative positions of the two cameras and mirror are maintained.

Having set up the rig shown in FIGS. 1 and 2, two master film negatives are made by exposing the films in the cameras to whatever subjects are required to be shown in the final motion picture. The films from the cameras are then developed the normal way as represented by the boxes denoted 54 and 56 in FIG. 4.

FIG. 5 illustrates a conventional contact printing step in which the master film negative is used to make a contact print that is then used when projecting the film. The images on the contact print are identical with the images on the master film negative but the print is a "positive" of the film. In FIG. 5, the two negatives 58 and 60 are shown schematically in face-to-face contact with respective films denoted 58' and 60' that become the contact prints. This operation is performed in a contact printer. In some cases, an intervening step is employed to make a so-called "interpositive" print from the master film negative, from which a "internegative" print is made that is then used to make the final contact print. This allows a greater number of final contact prints to be produced. In any event, the end result is a contact print as prints 58' and 60' that can be used for projection. The two contact prints are shown in FIG. 6 and it will be seen that they are identical with the master film negative shown in FIG. 3.

Figure 8:
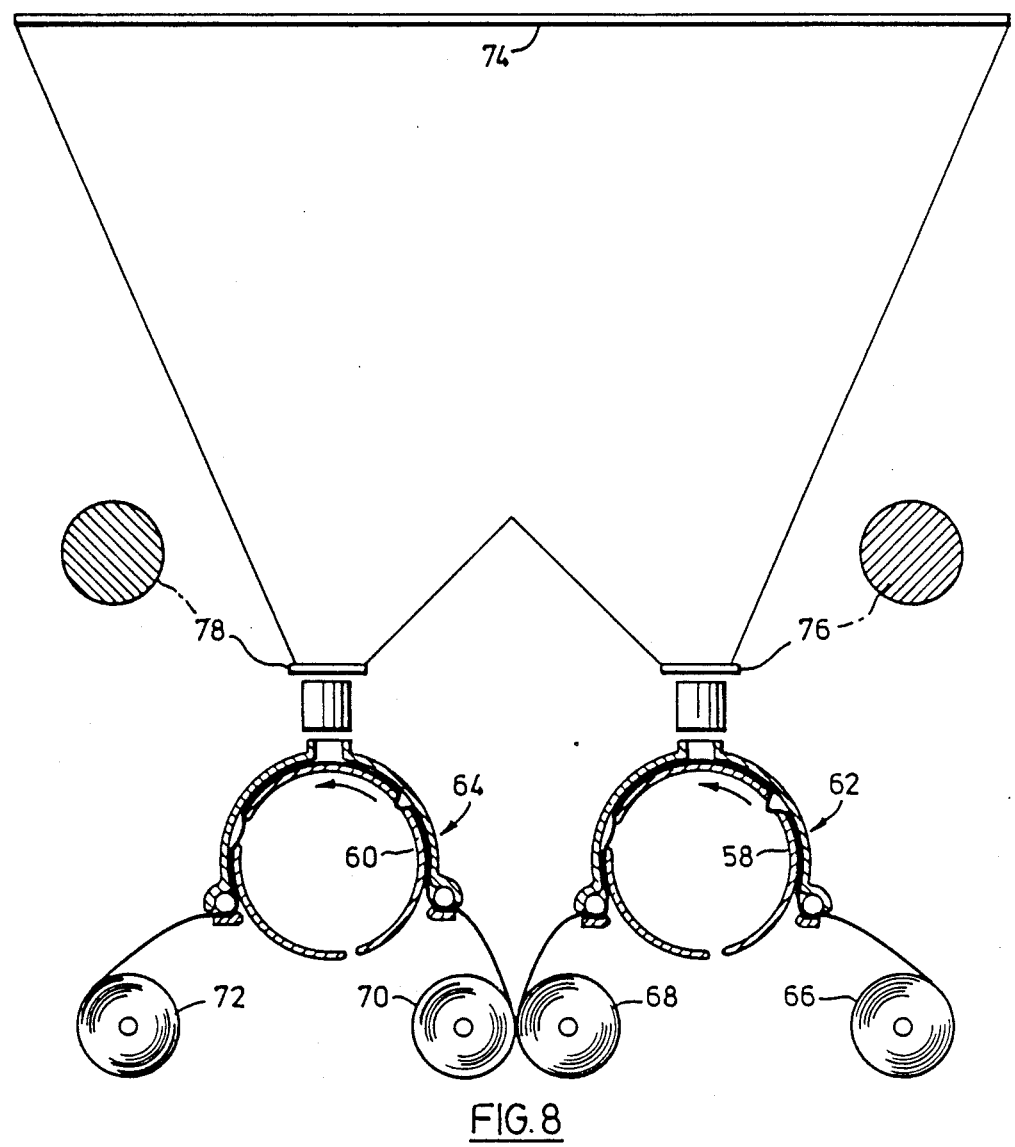
FIG. 8 is a diagrammatic plan view of a projector installation for projecting the prints shown in FIG. 7.

FIG. 8 is a plan view of a projector installation for use in showing the prints 58' and 60'. The installation includes respective right and left projectors 62 and 64 each having associated film magazines 66, 68 and 70, 72 respectively. Print 58' is shown travelling from one magazine to another in projector 62 while print 60' is similarly shown in projector 64. The two projectors are arranged to project coincident 3-D images from the two films onto a screen denoted 74.

In this particular embodiment, the two projectors 62 and 64 are shown schematically as IMAX projectors of the general form described in U.S. Pat. No. 3,600,073, the disclosure of which is incorporated by reference. This patent discloses specific details of the projector. For present purposes, it is sufficient to note that successive rolling loops of film are conveyed around a circular stator by a rotating rotor so that the film generally follows an arcuate shaped path as shown in FIG. 8.

Referring back to FIG. 6, the print 58' from the "right eye" master film negative 58 is loaded directly into projector 62 and is projected by illuminating the film from the front as seen in FIG. 7 so that the image will be inverted and reversed by the projection lenses and appear correctly on the screen 74.

The print 60' from the "left eye" film negative, on the other hand, is first "flipped" or turned face for face about the longitudinal axis X—X of the negative as indicated by arrow A in FIG. 6 so that images on the negative are inverted as compared with the images recorded on the film during photography and reversed so that they are no longer mirror images. This brings the images on the two negatives into corresponding orientations for projection as shown in FIG. 7. In that view, the two prints 58' and 60' as seen from the sides of the prints that are closest to the projection lamp when the prints are running in the projectors (i.e. the prints are shown as seen looking at the projection screen). The projection lenses will invert the images and reverse them left to right so that the images will be correctly projected onto the screen.

Coding of the left and right eye images as discussed previously is effected in this embodiment by the use of polarizing filters indicated at 76 and 78 in FIG. 8. In this embodiment, the filters 76 and 78 are arranged to polarize the light from the projectors 62 and 64 in directions that are 45° to the right and left of vertical respectively as shown by the circled areas indicated by chain dotted lead lines.

Figure 9:
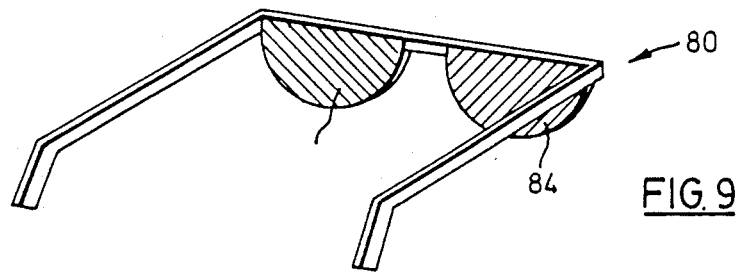
FIG. 9 illustrates a pair of polarized spectacles used in viewing the films; and, FIGS. 10 and 11 are views similar to FIGS. 1 and 3 respectively showing a different embodiment of the invention.

FIG. 9 shows a pair of spectacles 80 that will be worn by people viewing the film. The spectacles have respective left and right eye lenses 82 and 84 in the form of polarizing filters. The left eye lens 82 is polarized in the same direction as filter 78 so that it will not admit polarized light from the right eye projector 72 while lens 84 is polarized in the same direction as filter 76 so that it will not admit light from the left eye projector 64. The viewer will then see true stereoscopic or 3-D images on the screen 74.

Figure 10:
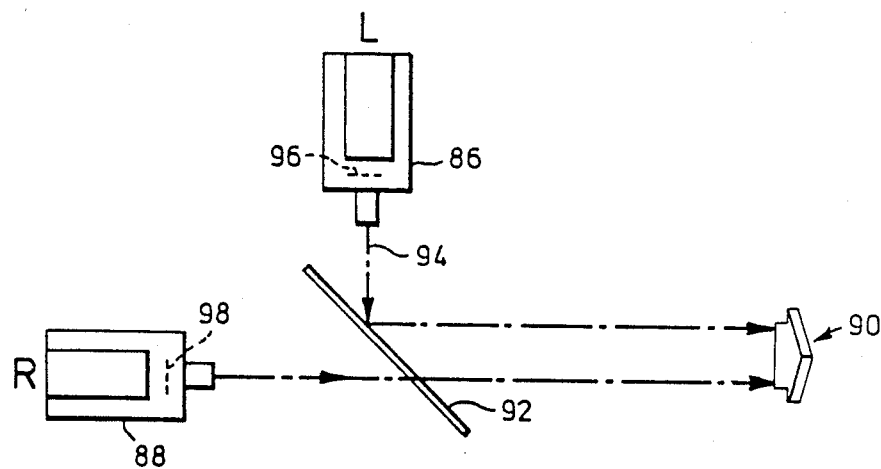
Figure 11:
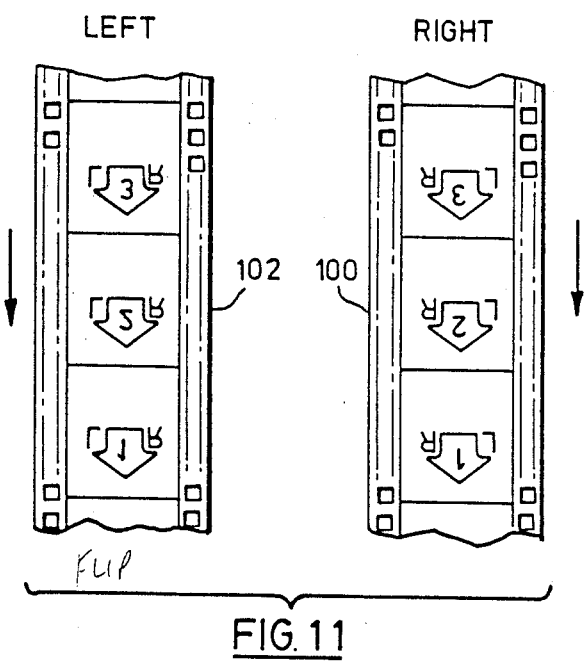

FIGS. 10 and 11 are views similar to FIGS. 1 and 3 respectively and illustrate the method of the invention as practised using conventional (i.e. non-IMAX) motion picture cameras in which the film travels vertically through the camera.

FIG. 10 is a plan view showing left and right cameras 86 and 88 respectively viewing a subject 90 by way of a mirror 92 arranged in a camera rig generally similar to that shown in FIGS. 1 and 2 except in that, in this case, camera 86 is positioned laterally to the side of camera 88 with its optical axis 94 horizontal. Film in the two cameras indicated at 96 and 98 respectively travels vertically downwards in the two cameras.

FIG. 11 shows negatives 100 and 102 from the right- and left-hand cameras respectively. In this case, because of the direction of travel of the films through the cameras, the film images appear so that an erect image extends longitudinally of the film instead of transversely as in the previous embodiment. The images on the film 100 from the right eye camera 88 are inverted and reversed right to left whereas the images on film 102 have additionally been reversed as a result of being reflected in mirror 92 (i.e. are mirror images). After developing the films and making contact prints, the contact print from film 102 can be flipped or turned face-for-face about a longitudinal axis of the print so that the images are corrected for projection as described in connection with the preceding embodiment.

It will of course be understood that the preceding description relates to particular preferred embodiment of the invention only and that many modifications are possible within the broad scope of the invention. Some modifications have been indicated previously and others will be apparent to a person skilled in the art. For example, as noted, even though IMAX cameras and projectors have been referred to specifically, they are not essential to the invention within the broad scope of the claims (see FIGS. 10 and 11).

The cameras shown in the drawings could of course be reversed so that the right eye camera instead of the left eye camera would shoot via the mirror. Also, in FIGS. 1 and 2 the "second" camera (shown as the left eye camera 24) could be positioned below the mirror with its optical axis extending vertically upwards. In the embodiment of FIGS. 11 and 12, the "second" camera can of course be positioned at either side of the mirror.

I claim:

1. A method of producing and displaying a 3-D motion picture, which method comprises the steps of:
    (a) providing a camera rig that includes first and second motion picture cameras each having a lens defining an optical axis, and a semi-transparent mirror;
    (b) positioning the cameras and mirror in a relationship with respect to one another such that, with the rig in a datum position, the first camera is arranged with its said optical axis horizontal for recording images of a subject through the mirror along a first axis coincident with its said optical axis, the said second camera is arranged with its optical axis at a 90° angle to the optical axis of the first camera, and the mirror is disposed at the intersection of said optical axes in a plane that bisects said 90° angle and permits the second camera to record images of the same subject along as second axis that is reflected by the mirror to be coincident with said optical axis of the second camera, said first and second axes being generally parallel to and spaced from one another by a defined distance and in a common horizontal plane, whereby one of the cameras receives "left eye" images of the subject and the other camera receives "right eye" images;
    (c) making two master film negatives by exposing respective films in said cameras to subjects intended to appear in the motion picture and developing the films;
    (d) making respective prints from said master film negatives;
    (e) projecting respective left and right eye images from the two prints to provide 3-D images on a screen; and,
    (f) optically coding the left and right eye images and providing a viewer with optical decoding means for ensuring that left eye images are presented to the viewer's left eye only and that right eye images are presented to the viewer's right eye only;

the improvement comprising the combination of:

(i) in step (b), positioning said second camera with its said optical axis vertical, and providing that said first and second cameras are of a type in which film travels generally horizontally through the camera in said datum position of the rig such that an erect subject is recorded on said film in said first camera as a series of parallel inverted images and, on said film in said second camera, as a series of images that are similar to the images on the film in the first camera, but turned laterally of the film as a result of being reflected in said mirror, said images extending transversely of the film in each camera;

(ii) in step (d) making said prints from both of said master film negatives by contact printing; and, (iii) prior to projecting said images in step (e), positioning the contact print made from the master film negative from the first camera in a normal orientation for projection, and turning the contact print made from the master film negative from the second camera face for face about a longitudinal axis of the print, so that images on said print are turned laterally of the print as compared with the images as recorded during photography, whereby the images on the two prints are brought into corresponding orientations for projection.

2. The improvement claimed in claim 1, wherein step (e) is performed using rolling loop film projectors.

3. The improvement claimed in claim 1, wherein said step of optically coding the left and right eye images is effected by providing the respective projectors with polarizing filters that are polarized in directions at right angles to one another, and wherein the optical decoding means comprises spectacles for each viewer having the left and right eye lenses comprising filters polarized to correspond with the polarizing filters of the projectors.

4. A method of producing and displaying a 3-D motion picture, comprising the steps of:

providing a camera rig that includes first and second motion picture cameras each having a lens defining an optical axis, and a semi-transparent mirror;

positioning the cameras and mirror in a relationship with respect to one another such that, with the rig in a datum position, the first camera is arranged with its said optical axis horizontal for recording images of a subject through the mirror along a first axis coincident with its said optical axis, the said second camera is arranged with its optical axis vertical and at a 90° angle to the optical axis of the first camera, and the mirror is disposed at the intersection of said optical axes in a plane that bisects said 90° angle and permits the second camera to record images of the same subject along a second axis that is reflected by the mirror to be coincident with said optical axis of the second camera, said first and second axes being generally parallel to and spaced from one another by a defined distance and in a common horizontal plane, whereby one of the cameras receives "left eye" images of the subject and the other camera receives "right eye" images, and the cameras being oriented such that an erect subject is recorded as a series of parallel inverted images on a film that is advanced in said first camera and, as a series of similar, mirror images that are turned laterally of the film as a result of being reflected in said mirror, on a film that is advanced in said second camera; said first and second cameras being of a type in which film travels generally horizontally through the camera in said datum position of the rig such that an erect subject is recorded as an image extending transversely of the film in each camera;

making two master film negatives by exposing respective films in said cameras to subjects intended to appear in the motion picture and developing the films, each said film having an emulsion side which is exposed to the subject;

making respective prints from said master film negatives, each said print being made from film stock having an emulsion side, by contact printing the relevant master film negative with the film stock, emulsion side-to-emulsion side;

projecting onto a screen respective left and right eye images from the two prints to provide coincident 3-D images on said screen, said projecting step including positioning the print of the master film negative from the first camera with its emulsion side towards the screen and positioning the print of the master film negative from the second camera with its emulsion side away from the screen; and, optically coding the left and right eye images and providing a viewer with optical decoding means for ensuring that left eye images are presented to the viewer's left eye only and that right eye images are presented to the viewer's right eye only.

* * * * *